(12) United States Patent
Goodhill et al.

(10) Patent No.: US 6,450,644 B1
(45) Date of Patent: Sep. 17, 2002

(54) SYSTEM AND METHOD FOR REGISTERING MOTION PICTURE FILM

(75) Inventors: Dean K. Goodhill, Los Angeles; Ty Safreno, San Luis Obispo; Don P. Behrns, Los Angeles, all of CA (US)

(73) Assignee: Maxivision Cinema Technology, Los Angeles, CA (US)

( * ) Notice: Subject to any disclaimer, the term of this patent is extended or adjusted under 35 U.S.C. 154(b) by 0 days.

(21) Appl. No.: 09/481,602

(22) Filed: Jan. 12, 2000

(51) Int. Cl.[7] .................. G03B 21/46; G03B 21/50; G03B 1/48
(52) U.S. Cl. .................. 352/160; 352/92; 352/162; 352/221; 352/229
(58) Field of Search .................. 352/92, 160, 162, 352/166, 221, 229, 184, 187, 223; 250/559.02; 358/474; 348/97, 98; 396/248, 261; 353/95

(56) References Cited

U.S. PATENT DOCUMENTS

| | | | |
|---|---|---|---|
| 3,914,035 A | 10/1975 | Satterfield | 352/191 |
| 4,104,680 A | 8/1978 | Holland | 386/128 |
| 4,236,183 A | 11/1980 | Howe | 348/98 |
| 4,255,764 A | 3/1981 | Howe | 348/98 |
| 4,296,438 A | 10/1981 | Stemme et al. | 348/98 |
| 4,875,102 A | 10/1989 | Poetsch | 348/97 |
| 4,884,090 A * | 11/1989 | Tanaka et al. | 354/234.1 |
| 4,903,131 A | 2/1990 | Lingemann et al. | 348/97 |
| 5,150,957 A * | 9/1992 | Pearman et al. | 358/347 |
| 5,194,958 A * | 3/1993 | Pearman et al. | 358/214 |
| 5,266,979 A | 11/1993 | Brown et al. | 352/224 |
| 5,402,166 A * | 3/1995 | Mead et al. | 348/96 |
| 5,600,450 A | 2/1997 | Kaye et al. | 358/474 |
| 5,644,376 A | 7/1997 | Vetter | 352/241 |
| 5,734,171 A | 3/1998 | Witte | 250/559.02 |
| 5,812,895 A | 9/1998 | Du Vall et al. | 396/318 |
| 5,949,087 A * | 9/1999 | Cooper | 250/559.29 |
| 6,048,066 A * | 4/2000 | Inatome | 352/160 |
| 6,078,038 A * | 6/2000 | Cooper | 250/208.1 |
| 6,191,407 B1 * | 2/2001 | Cooper | 250/208.1 |

FOREIGN PATENT DOCUMENTS

| | | |
|---|---|---|
| EP | 0 443 766 A2 | 2/1991 |
| WO | WO 89/05554 * | 6/1989 |

* cited by examiner

*Primary Examiner*—Russell Adams
*Assistant Examiner*—Rodney Fuller
(74) *Attorney, Agent, or Firm*—Knobbe, Martens, Olson & Bear, LLP

(57) ABSTRACT

A system and method for registering the frames of film with respect to an aperture in a motion picture projector. A registration reference mark is applied to each frame corresponding to the location of the frame on the film. When the film is intermittently stopped in the projector's film gate, the registration reference mark is read to determine the location of that frame relative to the immediately preceding frame. If the frame in the gate is misregistered, the gate is moved to correctly register the frame prior to projection. By properly registering the frames, the "jitter" and "weave" associated with conventional projectors is eliminated and resolution of the projected film image is enhanced.

26 Claims, 11 Drawing Sheets

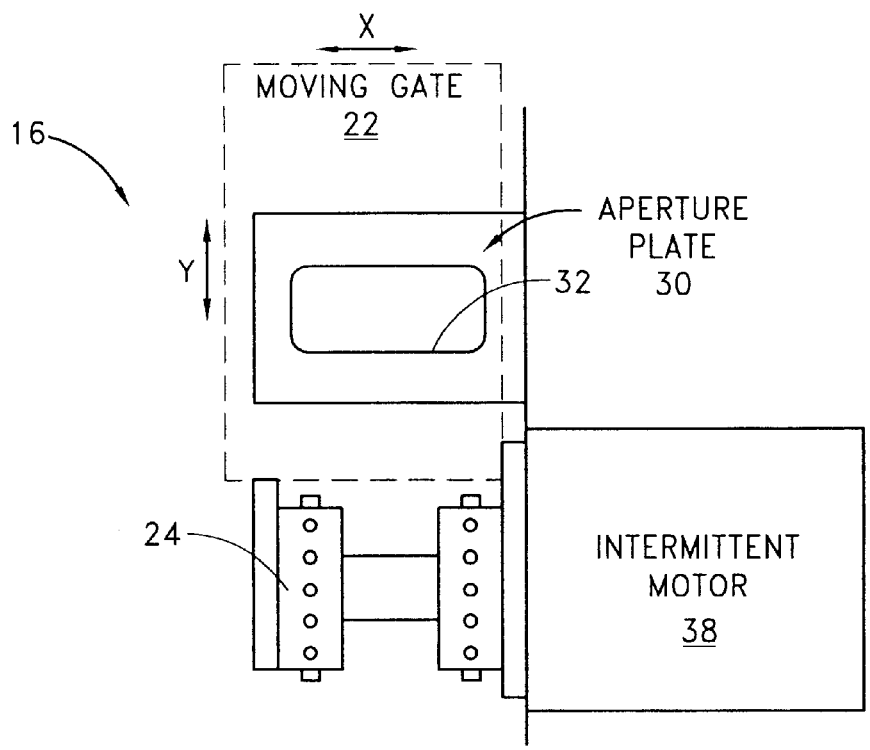
FIG. 5
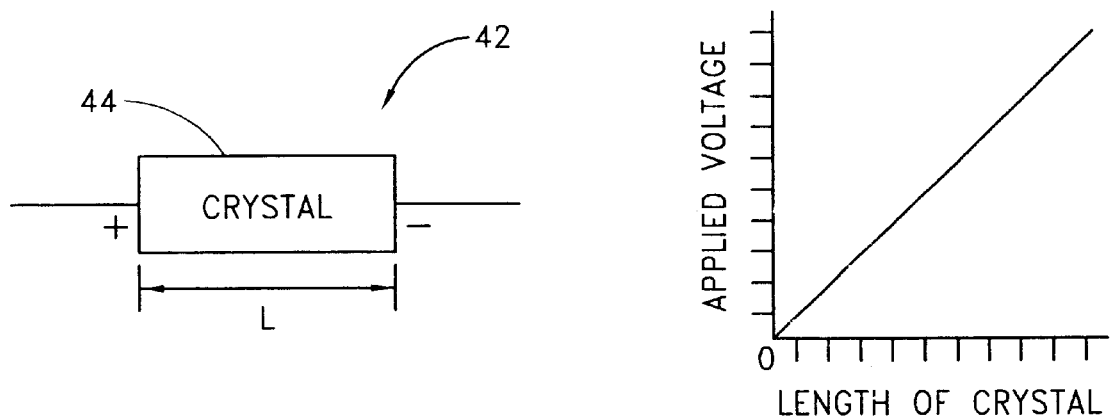
FIG. 6
FIG. 7

SYSTEM AND METHOD FOR REGISTERING MOTION PICTURE FILM

BACKGROUND OF THE INVENTION

1. Field of the Invention

The present invention generally relates to motion picture film registration techniques and, more particularly, to a system and method for correctly registering frames of motion picture film during the projection process to provide enhanced resolution of the projected images.

2. Description of the Related Art

Film projectors and the motion pictures they project have amazed and delighted audiences around the world for over a century. However, the term "motion pictures" is really a description of an illusion, for the pictures do not actually move at all. To the contrary, still images, typically 24 per second, must be projected in as static a manner as possible. This is not a simple proposition given the fact that in one minute 1,440 images or "pictures" are presented to the viewer. The illusion of motion is created by the differences between succeeding still images and is dependent upon the precise positioning or "registration" of these images with respect to an aperture in the projector.

One of the problems associated with existing motion picture film projectors occurs when succeeding images are positioned in slightly different locations in the projector's aperture. When this happens, a given point on those images will appear to be blurred, even if individual images show that point to be perfectly sharp. Of course, individual images in motion pictures are not viewed separately, but, rather, over time in rapid succession.

In the context of motion picture technology, the word "register" (the root for "registration") is not formally defined. Perhaps the closest applicable general definition is provided in the *Random House Dictionary Of The English Language,* Second Edition Unabridged (1983): "(11b) Print. Correct relation or exact superimposition, as of colors in color printing." In the art of motion pictures, however, "registration" has a slightly different meaning. Motion picture photographic "registration" means the repeated placement of each image, one after another, in as precise a manner as possible throughout the entire chain that comprises the system of cinema imaging. As described below, there are several steps in this chain, starting with creation of the image and ending with its projection.

At the outset, film is moved through the camera intermittently and positioned by "registration pins" in precisely the same place, called the "aperture". In this way, a succession of areas called "frames" are exposed to light, thus creating "latent images" that become a visible image after development. Because the "frame" defines the rectangular space on the film that is occupied by the "image," the terms "frame" and "image" shall be used interchangeably and synonymously with each other herein.

During editing and other post-production processes, images created in the camera are modified when appropriate. Then they are duplicated for distribution through a process that involves intermediate steps. These intermediate steps include contact printing of an inter-positive ("IP"), and using that IP to make inter-negatives ("IN").

In the next step, the IN is transferred onto release print film via high-speed contact printing, which is an unregistered process that operates at up to 17x-play speed, or faster. The "release prints" made by this process are distributed to theaters for projection. When the release prints are projected, the frames are intermittently positioned in a fixed position relative to the "aperture" of a projector's "gate." Light from a lamphouse in the projector projects the images onto a screen for viewing by an audience.

Registration is not a factor in creating high resolution still photographic images. The photographer and viewer of a still photograph are concerned only with a single image recorded and printed from a single piece of film containing that image. However, registration is a crucial component required for high resolution imaging in motion pictures. As noted above, motion pictures are dependent on thousands of images seen one after another in rapid succession. Thus, in motion pictures, the collective impression of resolution or sharpness is highly dependent upon the repeatable, accurate positioning in the projector of every image that is photographed and projected.

"Resolution" is another term for sharpness or clarity. In motion pictures, resolution is a function of several factors, which include: (1) lens sharpness; (2) film negative granularity; (3) repeatable, accurate registration of the film in the camera's aperture; (4) repeatable, accurate registration during exposure of film IP's, IN's, and release prints; (5) film print granularity; and (6) repeatable, accurate registration of the release print in the projector. Of all these factors, nos. 4 and 6 are the most severely flawed in current motion picture technology. According, a long-felt need has existed for a system and method that can address these factors and thereby provide more precise registration and enhanced resolution across the entire system of motion picture imaging.

The final measurement of motion picture resolution must be made by analysis of a projected image at 24 frames per second (standard) or faster, not by inspection of individual frames as with still photography. Ideally, the registration precision of the projector should match that of the camera. Unfortunately, that is not now and never has been the case. As noted above, motion pictures cameras use highly precise, mechanically activated "registration pins" to achieve and maintain final and repeatable film positioning from frame to frame. On the other hand, theatrical projectors use registration techniques that are, at best, considerably inaccurate about both the longitudinal and lateral axes. This inaccuracy gets progressively worse as various mechanical parts in the projector's intermittent movement and gate are subjected to normal wear over time. But the primary cause of this inaccuracy is the 100-year-old design of the projector movement itself. Projector gates, intermittent sprockets, and the "Geneva" mechanism that turns these sprockets in a pause-then-rotate cadence have failed to evolve in any meaningful manner.

As described more fully below, projector registration in its present state is primarily achieved by means of the friction provided by spring tension in the projector gate, acting against the film, which is advanced by the rotational movement of the intermittent sprocket. This intermittent sprocket is typically positioned about 2 to 4 inches or more below the aperture and pulls the film through the gate. When the intermittent sprocket stops pulling the film, the spring tension in the gate acts on the film sandwiched within it and friction causes the film to stop. But this is a highly passive design that lends itself to imprecision. For example, gate friction varies due to adjustable spring tension. Moreover, the film print itself exhibits variable "slickness" due to waxing, wear and other environmental factors. Therefore, each succeeding frame simply cannot be registered in the exact same location as the preceding frame.

During projection, inaccurate longitudinal registration of the film produces an up and down film movement called "jitter," while inaccurate lateral registration produces a side-to-side film movement called "weave." Both jitter and weave are greatly magnified by the extreme enlargement of projection. At a minimum, jitter and weave in any noticeable amount will result in a softening and blurring of detail and impair the resolution of the projected images.

The use of larger images on film, as with the various 70 mm formats, creates a sharper image on screen simply because less enlargement is required to fill the screen. Consequently, the jitter and weave of the image is less noticeable with 70 mm release prints. However, the higher cost and the lack of 70 mm projectors in most theaters renders the various 70 mm formats moot as an option, except in a few "special venue" theaters. Indeed, if jitter and weave in the 70 mm projectors could be reduced or eliminated, the projected image would be even sharper.

Current theatrical motion picture projectors inherently create jitter and weave because they lack any kind of positive film registration technology. Furthermore, the high-speed printing process used to manufacture most IP's and IN's and thousands of release prints distributed to theaters creates yet another level of jitter and weave in itself. In order to understand the problems that this causes when the film is finally projected, it is necessary to understand how motion picture images are photographed.

In a typical camera movement, film is driven from the camera magazine by a constant speed sprocket, which maintains an upper loop of film. A pulldown claw driven by an eccentric cam-like movement penetrates the film's perforations and pulls the film into precise registration in the camera's aperture. The upper loop, much of which is taken up for this operation, is replenished by the continuous rotation of the constant speed sprocket. Next, with the film stopped, the registration pins penetrate adjoining perforations in the film, while simultaneously the pulldown claw retracts and begins moving back into position to take hold of the next length of film to be pulled down. Meanwhile, as the registration pins penetrate the film's perforations, their tapered teeth gently move the film into precise position. The registration pins are restricted to a simple back and forth movement and are locked in a predictable, repeatable accurate mechanical design. Also, the registration pins are located immediately adjacent to and often surrounding the portion of the film to be exposed. For these reasons, they are very accurate and allow the camera to expose a continuous succession of images in precise registration.

In a typical projector movement, however, there is very little similarity to camera movements. Although a typical projector has a constant speed sprocket that feeds film to maintain an upper loop, all similarity to cameras ends at that point. Unlike a camera, the film's advance into the projector gate is provided by a powerful pull from an intermittent sprocket positioned below the projector gate's aperture, through which light is passed during projection. The projector gate is a gently curved, spring tensioned "trap" that exerts friction on the film and thus acts in opposition to the motive force that pulls film through it. When the intermittent sprocket stops pulling the film through the gate, the friction exerted by the gate stops the film. Unfortunately, this mechanism cannot duplicate the precise registration provided by cameras for several reasons.

First, the gate's friction, as applied to the movement of the film, is adjustable and varies from projector to projector. Higher friction provides heightened opposition to the film's intermittent movement, but simultaneously demands that more torque be applied to overcome this static friction for frame-to-frame advance. This can cause film stretching or, in extreme cases, breakage. Also, gate friction that is too high may cause so much film resistance that the teeth of the intermittent sprocket will deform the perforations in the film during pulldown, which leads to deteriorating registration in every subsequent showing of the film. But if gate friction is reduced too much, the film may continue moving slightly after the rotation of the intermittent sprocket stops. In these cases, the film overshoots the proper location in a way that is prone to be erratic from frame-to-frame.

Second, film prints are often waxed or otherwise provided with a slick surface in order to slide through the gate with reduced resistance and/or to help prevent stretching of the film. This prevents the film from stopping in the gate in precisely the same place from one frame to the next.

Third, film often shrinks or expands due to age, humidity and other factors. Thus, the distance from the image in the aperture to the intermittent sprocket necessarily varies. The effect of such shrinkage or expansion increases with greater lengths of film. Therefore, the distance between the aperture and the intermittent sprocket includes further margin for error.

Fourth, the mechanism that advances the intermittent sprocket is driven by a "Geneva" movement, which is subject to wear. The Geneva movement is well known and comprises a "Maltese" cross-shaped device, with slots cut into each cross. A rotating cam-like device turns within it, with a pin that engages the slots in the cross. This produces a pause-then-rotate intermittent movement, which is then applied to a shaft connected to the intermittent sprocket that pulls the film through the aperture from below the gate. Although the Geneva movement turns in an oil bath that is designed to inhibit metal-to-metal contact, like any mechanical device, there is always some wear. This wear causes slight imprecision in the application of the motive power to the connecting shaft, the intermittent sprocket and the film itself, which is then magnified by the act of projection.

Fifth, the slightest bend in the shaft connecting the Geneva movement to the intermittent sprocket will impart an eccentric movement to the intermittent sprocket, so that instead of rotating in a circular movement, it will rotate in a slight oval-shaped pattern. This in turn exacerbates any imprecision in the Geneva movement, which, in turn, impairs resolution of the projected image.

Finally, release prints are made on non-registered, high-speed printers that introduce additional imprecision by placing the images in different positions with respect to the film edges and perforations. In other words, this non-registered printing process microscopically misplaces frames in such a way that they are no longer located in a precise, repeatable relationship to the edges and perforations of the film.

Certain special-purpose, pin-registered projectors have been built for a type of special effects cinematography called "process shots," but these projectors were not designed for theatrical projection. Instead, they were designed to achieve precise registration with the assumption that they would be showing prints made on some type of relatively slow, highly accurate printer, rather than release prints duplicated by high-speed, non-registered contact printers.

Two new projector designs have recently appeared for 70 mm special-venue applications that provide some equivalent of pin registration. The Mega-Systems projector has two intermittent sprockets, placed both above and below the aperture. A curved, one-sided gate mechanism is brought into intimate contact with the film by sliding back toward it.

This design is intended to allow for film shrinkage or expansion while still providing positive registration. The Linear Loop projector by IWERKS seeks to achieve the equivalent of positive pin-registration by using blasts of controlled, compressed air to advance film across a parallel set of linear sprockets placed on either side of the projector's aperture. These linear sprockets, which are analogous to railroad tracks, hold the film's perforations as succeeding frames are advanced by means of a "standing wave" of film that rolls across the sprockets, propelled by the air blast. Though these two projectors provide registration that duplicates, somewhat, the positive registration found in cameras, they do not address the misalignment created by non-registered high-speed contact printers.

In another area of motion picture technology called "telecine," where motion picture images are transferred to videotape, various methods have been developed to achieve a stable image. While there are differences in the devices and methods used to achieve image stabilization in these telecine-based systems (sometimes called "electronic pin registration"), they all have one thing in common—they all seek to stabilize the film image by reference to the film edges and/or perforations on the film. This is acceptable in telecine, because telecine uses "low contrast" prints that are made at 180 feet per minute in "wet gate" contact printers. Thus, the image position on low contrast prints used in telecine bears a relatively accurate relationship to the film's edges and/or perforations. However, the technique of using the edges and/or perforations on release prints as a reference to stabilize the film image wrongly assumes that the images on the film are correctly registered with respect to the edges and perforations, as they are in the camera or with prints made on relatively slow, highly accurate printers. As discussed above, theatrical release prints are made on non-registered contact printers at speeds often in excess of 1,500 feet per minute. This high-speed, non-registered printing process microscopically misplaces frames in such a way that they are no longer located in a precise, repeatable relationship to the edges and perforations of the film.

While various types of electronic pin registration and/or image stabilization methods and technologies work well when scanning prints made on registered printers, they cannot correct for improper placement of the image relative to the edges and/or perforations of the film. As discussed above, such improper placement is a common occurrence due to errors engendered in high-speed contact printing of theatrical release prints. Consequently, electronic pin registration has limited value for theatrical projection. In fact, none of these systems were designed with that purpose in mind. Rather, they all declare to be directed toward the process of scanning film to video or digital electronic form.

Accordingly, there has existed a definite need for a system and method that can achieve precise image stabilization and enhanced resolution for theatrical motion picture film projection, that corrects for misplacement of images on the release print film (compared to the original negative), and which does not rely on the edges of the film or its perforations to do so. The present invention satisfies these and other needs and provides further related advantages.

SUMMARY OF THE INVENTION

The present invention provides a system and method for precisely registering frames of film with respect to an aperture in a motion picture film projector. The projector comprises a gate for receiving and guiding film during intermittent advancement of the film through the projector. In accordance with the invention, information is applied to the film corresponding to the location of the frames on the film. The information associated with each frame is read by a sensor prior to projection to determine the location of the frame with respect to the aperture. If the frame is misregistered with respect to the aperture once the film stops in the gate, an actuator moves the film relative to the aperture to achieve the correct registration. By repeatedly registering the frames in the exact same location with respect to the aperture, the resolution of the projected motion picture image is substantially and advantageously enhanced.

In conventional projector designs, the gate is connected to the projector in a fixed manner relative to the aperture. In accordance with one embodiment of the present invention, however, the gate is adapted to move relative to the aperture. Movement of the gate relative to the aperture is provided by an actuator connected to the gate. In one form of the invention, the actuator comprises a piezoelectric motor or a moving coil motor. Both of these types of motors can be used in conjunction with a flexure stage to provide the required gate movement. The actuator preferably is configured to move the gate in increments as small as approximately 0.000002 inches in about 1 millisecond or less, depending on the frame rate. In addition, the actuator and the gate are configured such that the actuator can move the gate at least about 0.006 inches in both the X direction and the Y direction.

The information necessary to move the gate by the required amount is provided by the registration information applied to the film. In one form of the invention, the registration information comprises a registration reference mark that is capable of being read by a sensor. The registration reference mark preferably comprises a plurality of different shapes that are read by the sensor. In one aspect of the invention, the plurality of different shapes comprises at least a circle and a square or rectangle, where the diameter of the circle is equal to the width of the square or rectangle. In addition, a triangle may be positioned adjacent to the circle and the square or rectangle to provide further registration information.

The registration information is applied to the film in the same location relative to each frame. In this regard, the registration information preferably is located on the film in an area outside the frame, and, most preferably, the registration information is located in the space between adjacent frames. Furthermore, if desired, redundant registration information may be applied to the film for each frame.

The sensor that reads the registration information on the film may take a variety of forms. In one embodiment, the sensor comprises a light-based sensor. For example, the sensor may comprise an LED array on one side of the gate that transmits light through the registration reference mark on the film. The transmitted light is received by a CCD array on the other side of the gate. If desired, one or more mirrors may be used to reflect the light transmitted from the LED array onto the CCD array. In addition, redundant sensors may be used to read redundant registration information associated with each frame.

A registration processor controls the operation of the sensor and processes the registration information for each frame to determine the location of each frame with respect to the aperture. The location of these frames is determined by reading the registration information associated with each frame. The registration processor then uses the registration information to compare the location of a frame in the gate relative to the immediately preceding frame. If a frame is not properly registered with respect to the aperture in the same place as the immediately preceding frame, then the registration processor calculates the amount of film misregistration. Based on the amount of misregistration, the registration processor generates an appropriate output signal that is delivered to the actuator. This output signal commands the actuator to move the gate in such a manner that the frame is correctly registered relative to the immediately preceding frame. In this way, each of the frames will be registered in the same location relative to the aperture. The output signal may comprise a voltage-based signal, a current-based signal, or other suitable signal configured to move the actuator and thus the gate.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5 is a schematic view showing the position of the projector gate relative to an aperture of the projector.

FIG. 6 is a schematic view of a piezo crystal according to one embodiment of the present invention.

FIG. 7 is a graph depicting the relationship between applied voltage and the length of the piezo crystal.

DETAILED DESCRIPTION OF THE PREFERRED EMBODIMENTS

In accordance with the present invention, film frame misregistration is detected and corrected on a frame-by-frame basis to ensure precise registration of each frame with respect to the projector's aperture. By registering each frame in the same position with respect to the aperture, the resulting motion picture, comprised of these individual projected images, has dramatically enhanced resolution. Proper frame registration is achieved, and misplacement of images on release print film is corrected, by making corrective film movements while the film is intermittently stopped in the projector gate. As explained below, this precise film registration and the resulting enhanced film resolution is provided by making corrective film movements in only two directions, corresponding to the X direction and the Y direction.

Figure 1:
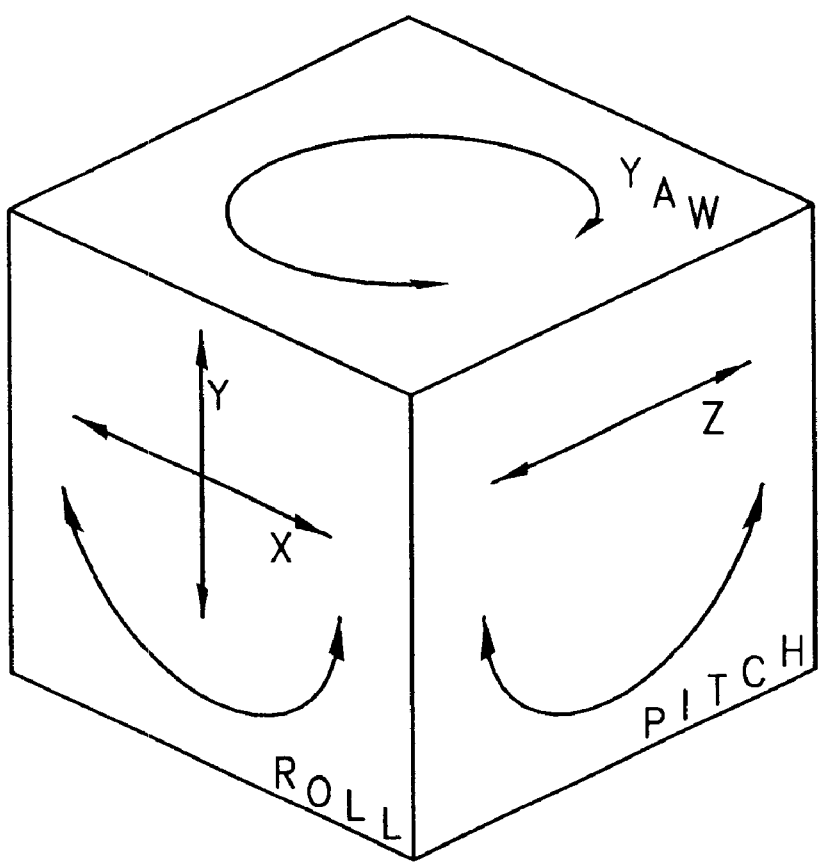
FIG. 1 is a diagrammatic representation of the six degrees of freedom for defining any location in three-dimensional space.

In this regard, and by way of further background, any type of motion can be described with reference to six degrees of freedom. As shown in FIG. 1, these six degrees of freedom comprise three degrees of linear movement commonly known as X, Y and Z, and three degrees of angular movement commonly known as yaw, pitch and roll. Because film is flat, and because of the way it is captured in the projector gate, there can be no discernable yaw or pitch movements of the film. Although there is some thermal shock defocusing of the film in the Z direction, due to the heat absorbed by the film from the projector's lamphouse, which causes the film to deflect slightly, any movement in the Z direction is considered to be a very minor aspect of misregistration, as compared to the misregistration of the film in the X and Y directions.

Figure 2:
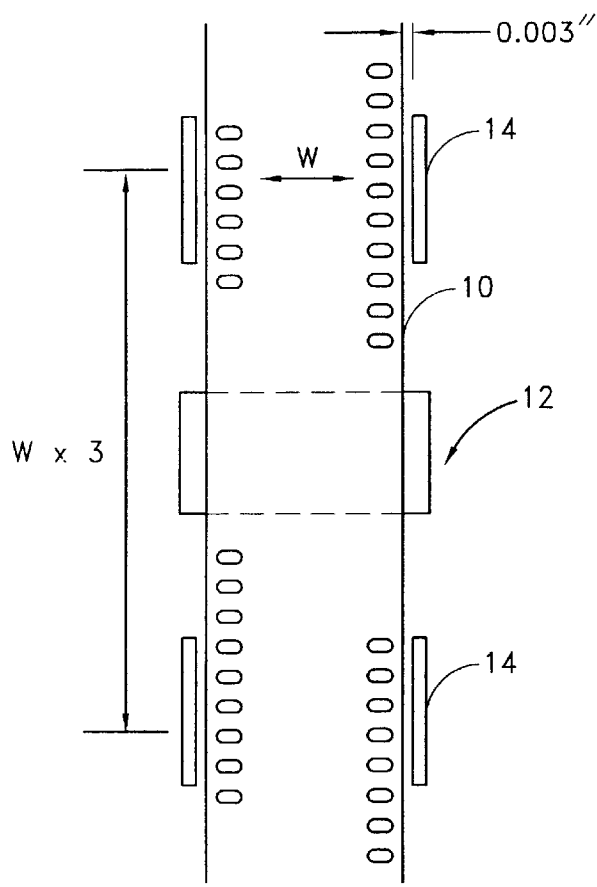
FIG. 2 is a schematic view of film travelling through a motion picture projector.
Figure 3:
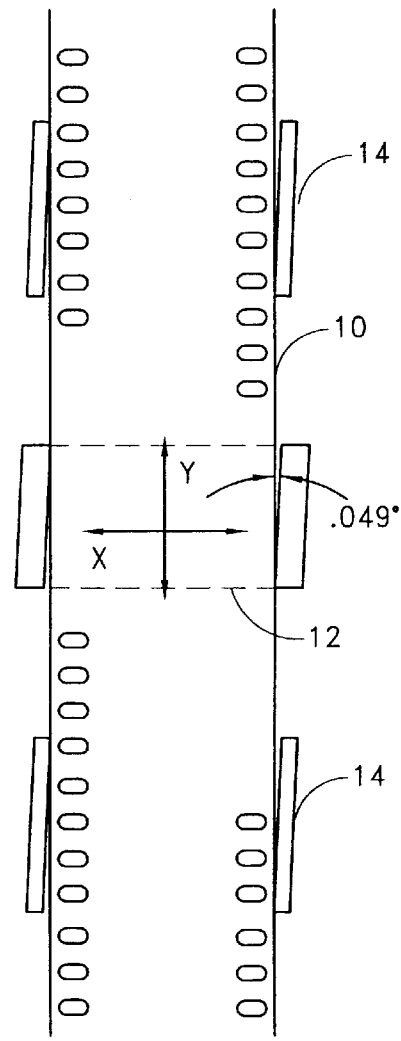
FIG. 3 is another schematic view of film travelling through the projector, showing the maximum amount of roll of the film in the projector gate.

Further, while it is possible to correct for possible misregistration due to roll, the magnitude of this movement is also considered to be relatively small. In this regard, as shown in FIG. 2, film 10 that travels through the gate is mechanically guided past the aperture 12 over a long distance compared to the width of the film. In most projector designs, the film 10 is guided by mechanical guide means 14, such that the film has the capacity to deviate in the gate in the X direction by only about 0.003 inches. As shown in FIG. 3, film 10 that moves by this amount would result in a maximum roll component of only about 0.049 degrees. This small angular rotation component is relatively insignificant and is unlikely to have any noticeable impact on resolution. Thus, the necessity and cost of correcting it is subject to question.

In view of the foregoing, and the fact that jitter and weave are the most significant factors that contribute to film misregistration, the system and method of the present invention is designed to detect and correct film misregistration in the X direction (weave) and the Y direction (jitter). It should be understood, however, that the principles of the invention can be applied to detect and correct film misregistration in other directions as well. Therefore, the description that follows should not be construed as limiting the invention to correct misregistration in the X and Y directions only.

Figure 4:
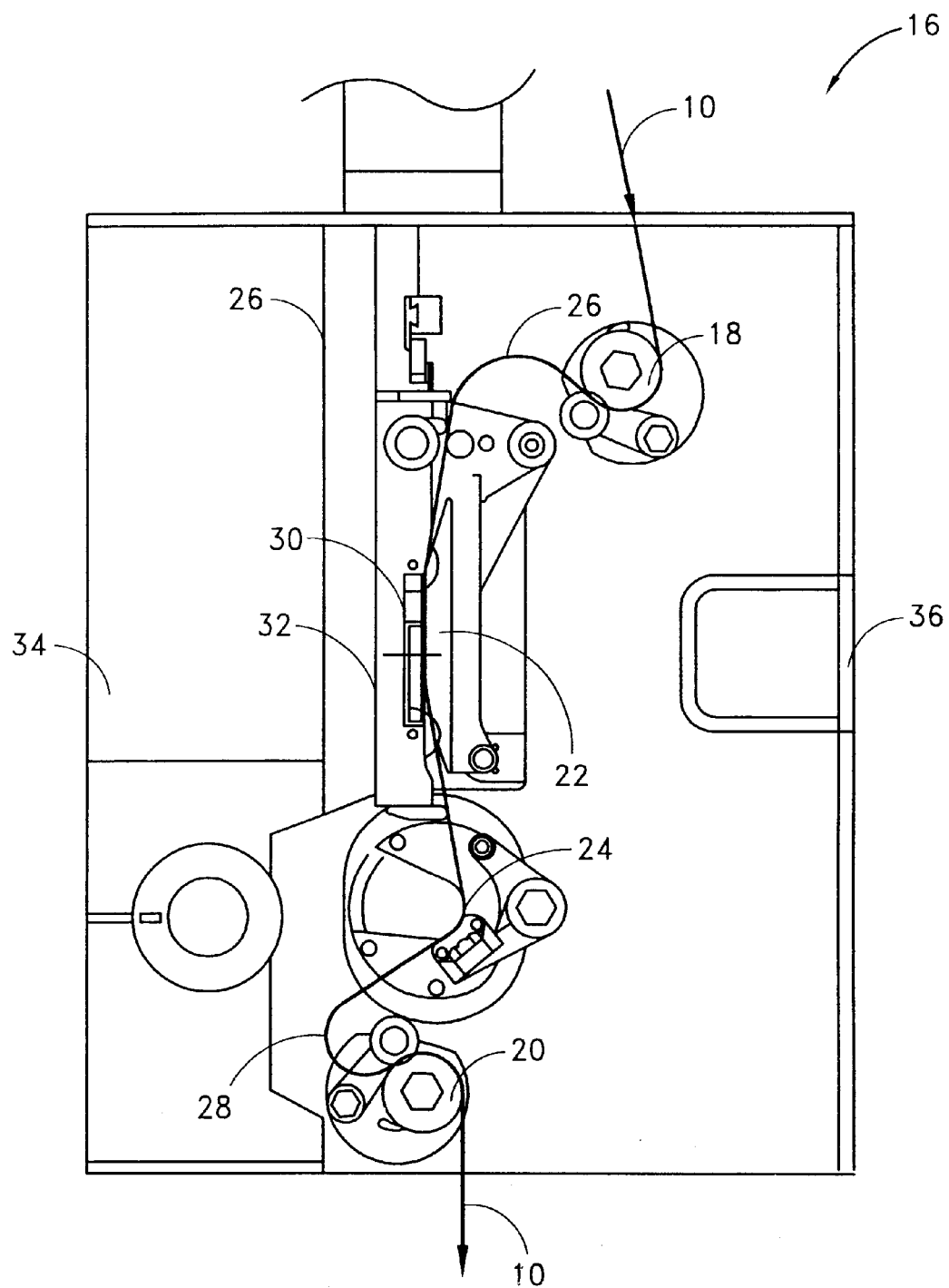
FIG. 4 is an elevational side view of a conventional motion picture film projector, showing film travel through the projector.

Referring to FIG. 4, a typical 35 mm projector 16 has two constant speed sprockets, comprising a feed sprocket 18 and a hold-back sprocket 20, located on opposite sides of a film gate 22. An intermittent sprocket 24 is also located between the gate 22 and the hold-back sprocket 20, approximately two to four inches (or more) below the gate. The intermittent sprocket 24 pulls the film 10 intermittently, frame by frame, through the film gate 22 in a well-known manner. Slack in the film 10, in the form of loops of loose film 26 and 28, is provided, respectively, between the feed sprocket 18 and the film gate 22 and between the intermittent sprocket 24 and the hold-back sprocket 20 to prevent film breakage.

The film gate 22 also includes an aperture plate 30 with an aperture 32 designed to be in optical alignment with a projection light source 34 (such as a lamp house) on one side of the gate and a lens 36 on the other side of the gate. A rotating shutter blade (not shown) between the aperture 32 and the lamp house 34 blocks light from the lamp house during pull down and registration of the film 10 and permits passage of light through the aperture upon registration of a frame 40 with respect to the aperture. The shutter blade or counter-rotating blades are rotated in a well known manner by a shutter motor (also not shown).

The gate 22 serves several functions during the projection process. One of these functions is to mechanically guide the film 10 through the projector 16. In this sense, the gate 22 acts as a mechanical alignment system, whose purpose is to control film movement in the X direction or "weave." The weave present in today's projectors primarily occurs as a result of variations in film width and mechanical deviations in the gate width.

Another purpose of the gate 22 is to apply friction to the film 10, which stops the film in the gate when the intermittent sprocket 24 stops pulling the film. In this context, the gate 22 is mechanically similar to a constant drag system and must have drag components large enough to quickly stop the film 10. Although the film 10 does not create a large inertial force, because film is a light material and there is only a small amount of it moving when the intermittent sprocket 24 advances the film, a static friction of up to several pounds is still required to overcome this inertia effect and stop the film. As between misregistration of the frames 40 in the X direction and the Y direction, however, misregistration in the Y direction is usually the largest of the two.

Because the gate 22 in conventional projectors is designed to register the frame 40 with respect to the aperture 32, the gate is an important aspect of the film registration process. However, for the reasons previously explained, it is virtually impossible for conventional projector gate designs to precisely register the frame 40 in proper alignment with the aperture 32. Accordingly, to correct for this constant misregistration from one frame to the next, the system and method in accordance with one embodiment of the present invention is designed to physically move the gate 22, after the film 10 has been stopped in the gate by friction, to precisely register the frame 40 with respect to the aperture 32.

FIG. 5 schematically illustrates the position of the gate 22, which, in accordance with the invention, is moveable in the X direction and the Y direction relative to the aperture plate 30 of the projector 16 and its corresponding aperture 32. The intermittent sprocket 24 is located below the gate 22 and is driven by an intermittent motor 38. In conventional projectors, as shown in FIG. 4, the gate 22 is attached to the projector 16 in a fixed position and therefore does not move. In accordance with the present invention, however, the gate 22 is configured so that it can be moved to provide for the necessary corrective movements that will result in precise registration of the frame 40 with respect to the aperture 32. In the preferred embodiment, the gate 22 is configured to move in the X direction and the Y direction, as necessary, to precisely register the film 10.

The range of gate movement in the X and Y directions preferably is sufficient to allow enough movement in each direction to correct for a "worst case" situation of misregistration. A worst case situation is believed to be a maximum deviation of about +/−0.003 inches, although it could be more or less than this amount. Therefore, to correct for these deviations, the gate 22 should be able to move at least about 0.006 inches in both the X direction and the Y direction. However, it will be understood that a larger range of gate movement is possible and that the invention is not limited to the specific ranges of movement set forth herein. In any event, in order for the range of gate movement to be able to provide enhanced resolution through precise frame registration, the corrective movements of the gate 22 preferably should be at a level and in increments that are at least on par with the obtainable film grain resolution available.

According to today's standards, typical film 10 has the capacity to resolve approximately 4,850 lines per inch in any axis. In order to correct misregistration and project an image as a steady picture, gate movement should ideally be at least ten to one hundred times more precise than the smallest film grain size. Gate movement at this level of precision would not only allow the system to accurately position one frame relative to the next, but it would also allow for future improvements in film stock technology. Accordingly, in one aspect of the invention, gate movement preferably can move the film in increments of 1/20 of a micron, or 0.000002 inches.

Movement of the gate 22 to correct misregistration of the film 10 preferably occurs during the period in which the film is stopped, after the pull down from the intermittent sprocket 24 and before the shutter opens. During this period of time, several operations must be performed. As explained in more detail below, these operations include determining the position of the film frame 40 relative to the previous frame, calculating the amount of corrective gate movement, and then moving the gate 22 accordingly.

Because the frames 40 will be registered at a rate of at least 24 frames per second (i.e., one frame about every 41.6 milliseconds), all of these operations, and particularly the movement of the gate 22, needs to be performed as quickly as possible. Movement of the gate 22 is accomplished mechanically and, therefore, is subject to certain physical limitations. Of course, the shutter will not open until the film 10 has been pulled down and stopped in the gate 22. If the amount of time to pull down each frame 40 is approximately 8.0 milliseconds, then the operations necessary to move the gate 22 and register the frame 40 must be performed in approximately 2.5 milliseconds after the film 10 has stopped and before the shutter opens. By allowing approximately 1.5 milliseconds to determine the location of the frame 40 and to calculate the amount and direction of corrective gate movement necessary, there is approximately 1.0 millisecond of time remaining to actually move the gate 22. If the frame rate is 48 frames per second, then the amount of time to move the gate 22 will be the same as those set forth above. Similar calculations can be made to budget the proper amount of time to move the gate 22 based on other frame rates that may be used.

In order to move the gate 22 within the time available to do so, the inertia of the gate ideally should be as small as possible. Accordingly, the intermittent motor 38 should not be attached to the gate 22, and the aperture plate 30 should remain fixed relative to the lens 36 and intermittent motor 38, with the gate 22 moving independently of both. The actual configuration to permit the gate 22 to move can be accomplished in several ways, so long as it has the freedom to move at least about 0.006 inches in the X and Y directions. For example, flexure stages, bearings, slides, and other suitable configurations can be used in conjunction with an appropriately configured gate 22.

In order to move the gate 22 by the distance necessary to accurately correct frame to frame misregistration, a movement mechanism is connected to the gate. This gate movement mechanism is referred to herein as an "actuator." Given the gate movement parameters discussed above, the actuator must be able to move the gate 22 rapidly (i.e., in about one millisecond or less). The actuator also must be able to move the gate 22 in a precise manner (i.e., preferably in increments of 0.000002 inches). An actuator capable of meeting these gate movement parameters may take several different forms. For example, it may comprise a system that utilizes fluids, air pressure, mechanical devices or electromechanical devices to provide the required movement. Of these options, electromechanical devices are presently preferred, due to the high level of control and the higher speed response that they provide.

Electromechanical devices come in many different forms, such as rotary or linear motors, piezoelectric motors, bi-material actuators, and other devices that change shape or size based upon an electrical influence. Rotary motors represent a common system that transfers rotary motion into linear motion through the use of a screw, cam or similar device. Linear motors, such as moving coil motors or speaker coil motors, are also candidates for the actuator due to their precise movements and quick response time. Bi-material actuators rely upon the dissimilar nature of two materials to cause a bowing or shape change that can be converted into precise linear motion. Of these options, piezoelectric motors or moving coil motors are presently preferred actuators.

The piezoelectric motor has several attributes that make it a very capable actuator. Among these attributes are the piezoelectric motor's high speed capability and its high positional accuracy. In fact, accurate moves in increments as small as one nanometer (i.e., one billionth of a meter), or less, can be achieved, provided proper mechanics and electronics are employed.

As shown schematically in FIG. 6, a piezoelectric motor 42 employs a piezo crystal 44 that increases or decreases in length in proportion to the voltage that is applied across the crystal. When the voltage across the crystal 44 is increased, the length of the crystal increases, whereas reduced voltage decreases crystal length (see FIG. 7). One advantage of using the piezoelectric motor 42 as the actuator is that it is not necessary to have a feedback loop or to constantly monitor the actual position and the commanded position of the gate 22. Feedback systems of this nature are commonly deployed in motor control applications and would be required if a moving coil motor (discussed below) is used as the actuator.

By eliminating the feedback loop, the amount of microprocessor power required by the piezoelectric motor 42 to both initially move the gate 22 and then keep it in the correct position during the time the shutter is open is reduced. Moreover, piezoelectric motors 42 have a highly reliable and predictable move distance based upon the applied voltage. As noted above, and as represented in FIGS. 6–7, voltage applied to the piezo crystal 44 causes it to increase or decrease by a very precise distance in a linear manner along the axis of the crystal. Therefore, a simple calculation or the use of available conversion tables will indicate the exact amount of voltage that must be applied to increase or decrease the length of the crystal 44 by any given distance with very high accuracy. While piezo crystals 44 are known to have a rebound affect, this effect occurs over an extended period of time and does not start to occur until at least several seconds have passed. Therefore, the rebound effect of the crystals is a very small factor because the time period between each corrective move is so small.

Figure 8:
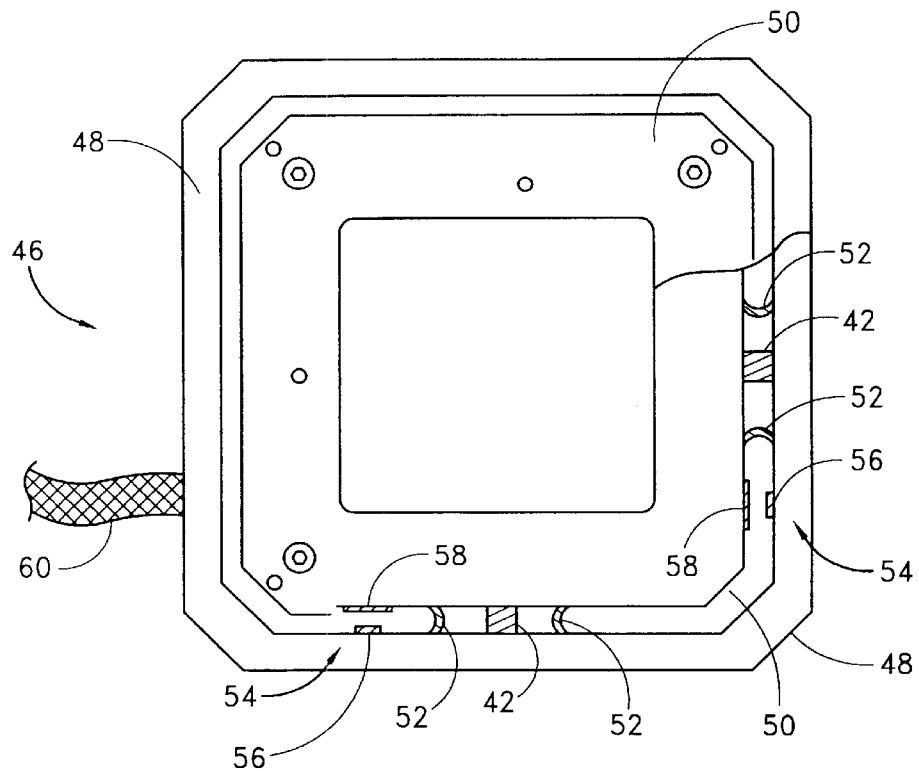
FIG. 8 is a schematic illustration of a piezoelectric motor flexure stage, shown partly in cut-away section, used to move the projector gate and correct for film frame misregistration, in accordance with one embodiment of the invention.

In one form of the invention, the piezoelectric motor 42 comprises a high-resolution piezoelectric motor flexure stage 46. As shown schematically in FIG. 8, the stage 46 comprises two piezoelectric motors 42 protected by an outer metal frame 48. The piezoelectric motors 42 have one end connected to the outer frame 48, which is fixed against movement, and another end connected to an inner frame 50 that is moveable with respect to the outer frame 48. As explained later in conjunction with FIGS. 14–16, the moveable inner frame 50 is connected to the projector gate 22, and the fixed outer frame 48 is connected to a suitable fixed structure of the projector 16 that surrounds the gate.

The stage 46 also includes a plurality of flexures 52, which are frictionless, stictionless devices that rely upon the elastic deformation or "flexing" of a solid material. The flexures 52 are connected between the outer frame 48 and the inner frame 50 and advantageously eliminate sliding and rolling. These flexures 52 essentially act like springs that bias the moveable inner frame 50 with respect to the fixed outer frame 48. They are capable of providing the small increments of movement in response to the linear motion of the piezoelectric motor 42, in accordance with the principal of material elastic flexing, to provide mechanical movement translation. The flexures 52 are also particularly advantageous because they eliminate the common linear path errors associated with linear bearings. Therefore, such flexure-type positioners are superior to traditional positioners, such as ball bearings, cross roller bearings, etc., in terms of resolution, straightness and flatness.

The peizoelectric motor flexure stage 46 is preferably equipped with at least two piezoelectric motors 42. The flexure stage 46 also may be provided with two high-resolution capacitive displacement sensors 54, but they are not required. The piezoelectric motors 42 provide the motion required to move the gate 22 with sub-nanometer resolution in the X direction and the Y direction. The capacitive displacement sensors 54 comprise a probe 56 and a slightly larger target plate 58. The sensors 54 also have sub-nanometer resolution and insensitivity to lateral motion. Digital control electronics connected to the stage 46 by a cable 60 can evaluate the combined information of the capacitive displacement sensors 54 and transform that information into two individual signals proportional to X and Y linear displacement.

High resolution piezoelectric motor flexure stages 46 of the type described above, and which have the capability of moving the gate 22 by the required range of motion, and in the required increments, are commercially available and can be obtained from, for example, Physik Instrumente GmbH & Co., Polytec Platz 1–7, 76337 Waldbronn, Germany. Piezoelectric motor flexure stages 46 available from this company can provide sub-nanometer movements and virtually unlimited resolution that is not limited by stick-slip effects or by threshold voltages. These stages 46 also have piezoelectric motors 42 that have an extremely fast expansion and thus provide an extremely fast responding positional element, with microsecond time constants. Furthermore, the piezoelectric motors 42 in these stages 46 have the further advantage that they are solid-state. Thus, they require no maintenance and are not subject to wear and tear.

Figure 9:
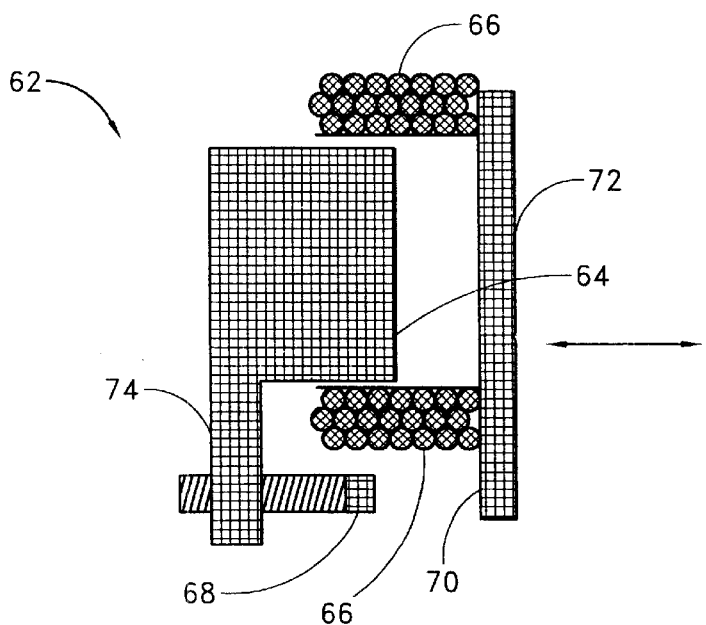
FIG. 9 is a schematic illustration of a moving coil motor used to move the projector gate, in accordance with another embodiment of the invention.

A moving coil motor 62 also may serve as a suitable actuator. The moving coil motor 62 uses a system very similar to a speaker. As shown schematically in FIG. 9, the moving coil motor 62 comprises a magnet 64 and a wire coil 66 surrounding the magnet. Like the piezoelectric transducer flexure stage 46 discussed above, the moving coil motor 62 also may be used in conjunction with a flexure stage having a plurality of flexures and high-resolution capacitive displacement sensors, including a probe 68 and a slightly larger target plate 70 to determine position. The wire coil 66 is connected to the inner frame 72 of the flexure stage that, in turn, is connected to the projector gate 22. The magnet 64 is stationary and fixed to the surrounding metal outer frame 74 of the stage. In use, current is passed through the wire coil 66. By varying the intensity of the current, the wire coil 66 will be moved relative to the stationary magnet 64 until an equilibrium is met between the stage flexures and the force of the magnet pull. In this way, the inner frame 72 of the stage and thus the gate 22 will be moved with respect to the outer frame 74 to properly position the gate 22 and register the frames 40 of the film 10.

The actuator preferably is moved or driven in a linear manner by an actuator driver. The actuator driver may comprise any suitable arrangement that allows control over the actuator in response to either a straight analog signal, a digitally processed signal, or another suitable signal. When the piezoelectric motor 42 serves as the actuator, the actuator driver comprises a voltage controlled system. If the moving coil motor 62 serves as the actuator, then the actuator driver is a current controlled system. Other suitable types of actuator drivers will be apparent and can be selected based on the type of actuator that is used.

The voltage control system for the piezoelectric motor 42 includes an electronic system capable of handling the bandwidth required to move the actuator by its required distance, i.e., at least 0.006 inches, in one millisecond or less. For example, a high voltage amplifier-based design taking a control signal from an analog front end circuit can be used. The analog front end circuit can be either an analog control circuit or a digital control circuit that converts to analog through an analog to digital converter.

The current control system for the moving coil motor 62 is similar to the voltage control system for the piezoelectric motor 42, except for the addition of a feedback loop to monitor the current output of the amplifier stage, either through an analog circuit or a digital circuit. The feedback loop monitors the current and adjusts it to follow a proportional gain value to the control signal coming from the analog front end circuit. If the current is too low, the feedback loop increases the voltage until the appropriate current is reached. Likewise, if the current is too high, the voltage is decreased until the correct current level is reached.

Having described the electromechanical aspects for physically moving the gate 22, the portion of the system that governs how far the gate must move, and which direction it must move, will now be described.

In order to move the gate 22 and position the frames 40 in proper registration with respect to each other and the aperture 32, it is necessary to determine the location of the frames once the film stops moving at the conclusion of each intermittent pull down by the intermittent sprocket 24. This determination of frame location from one frame to the next will reveal the amount of misregistration that needs to be corrected. In accordance with the present invention, registration information is applied to the film 10 corresponding to the location of the frames 40 on the film 10. This information is sensed or "read" in order to determine the frame's location relative to the frame that preceded it.

In one form of the invention, the information is embodied in a registration reference mark 76 adjacent to the frame 40. In the preferred embodiment, there is at least one registration reference mark 76 associated with each frame 40. By detecting the location of the registration reference mark 76 and comparing its location relative to the location of the immediately preceding registration reference mark, it is possible to determine the amount of movement necessary to correct misregistration on a frame by frame basis. With this comparative information, the difference between the locations of two successive registration reference marks 76 can be calculated and a signal sent to the actuator commanding it to move the gate 22 so that the two marks lay on top of each other. Once the registration reference marks 76 lay on top of each other, then the frames 40 will also.

When the film registration process starts, the first frame 40 with a registration reference mark 76 acts as a "benchmark" for the subsequent registration of every frame 40 that follows. In other words, the location of the first frame 40 relative to the aperture 32 is determined by sensing the location of a first registration reference mark associated with that first frame. The location of the next or second registration reference mark is also determined, and the gate 22 is moved so that the second mark lays on top of the first mark, at the same location as the first mark. Once the second registration reference mark has been aligned with the first registration reference mark (at the same location as the first registration reference mark), then the first and second frames will also be equally aligned or "registered." By precisely registering subsequent frames 40 of the film "on top" of each other in this manner, substantially all jitter and weave will be eliminated, and the resolution of the projected image will be substantially enhanced.

It will be appreciated that, at the beginning of the registration process, the first "benchmark" frame should be "centered" as much as possible with respect to the aperture 32. In other words, the center of the first frame 40 should be aligned as much as possible with the optical axis of the projector lens 36, which should also be in optical alignment with the aperture 32. In this way, all subsequent frames 40, which are registered with respect to the first frame, will be equally and correctly registered.

The registration references mark 76 can take a variety of different forms. The main requirement of the registration reference mark 76 is that it must be capable of being detected by a process that can determine the location of the mark and then compare that location to the location of the previous mark. For example, a circle is capable of functioning as one aspect of a registration reference mark. The circle can be located by a sensor and then compared to the location of the circle associated with the previous frame. Once the distance between the two circles and their direction relative to each other have been calculated, the actuator can move the gate 22 by the corresponding distance and direction to lay the two circles on top of each other in the manner described above.

Figure 10:
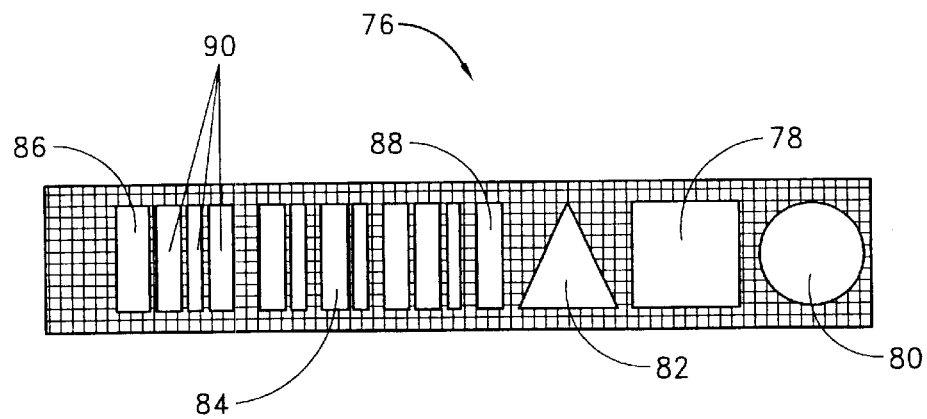
FIG. 10 shows a registration reference mark according to one embodiment of the invention.

The registration reference mark 76 in accordance with one embodiment of the invention employs multiple shapes. As shown in FIG. 10, these shapes may comprise geometric shapes, such as a square 78, a circle 80 and a triangle 82. The square 78, by definition, has a constant dimension on all four sides, i.e., from top to bottom and from side to side. The circle 80 is placed adjacent to the square 78 and is the geometric shape used to calculate the amount of misregistration of each frame 40. The diameter of the circle 80 is the same as the width of the square 78. Alternatively, a rectangle may be used instead of the square 78, so long as the width of the rectangle is the same as the diameter of the circle 80. The triangle 82 is placed on the other side of the square 78 from the circle 80. The base of the triangle 82 is shown aligned with the bottom of the square 78 and has a length that is the same as the width of the square, although triangles having other dimensions may be used.

If desired, the registration reference mark 76 may also include additional information. With reference again to FIG. 10, optional additional information is set forth to the left of the three geometric shapes. This other information may include, for example, binary information 84 indicating the frame size, film speed, movie title, lab origin, or any other appropriate information. The binary information may also include information signaling the start 86 of the information band at the beginning and a checksum 88 at the end. The type of message 90 also may be provided. However, this additional information is not needed or used to determine the location of the frame 40. Rather, as set forth above, frame location is determined by the three geometric shapes.

One aspect of the registration reference marks 76 involves the location of these marks on the film 10 and the number of marks that are used. Preferably, there is one registration reference mark 76 associated with each frame 40. In this way, each and every frame 40 will be precisely registered and resolution of the projected images will be maximized. Alternatively, registration reference marks 76 may be applied to every other frame 40, or in some other number or convention, to achieve better registration and resolution than conventional systems, although not as good as the resolution provided when each frame 40 is registered.

Figure 11A:
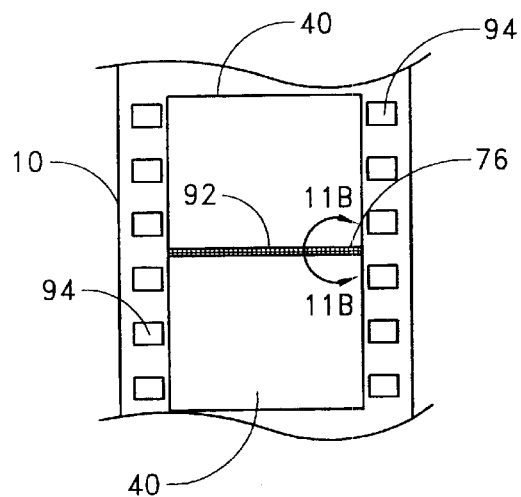
FIG. 11 a section of film showing the location of a registration reference mark between the frames of the film.
Figure 11B:
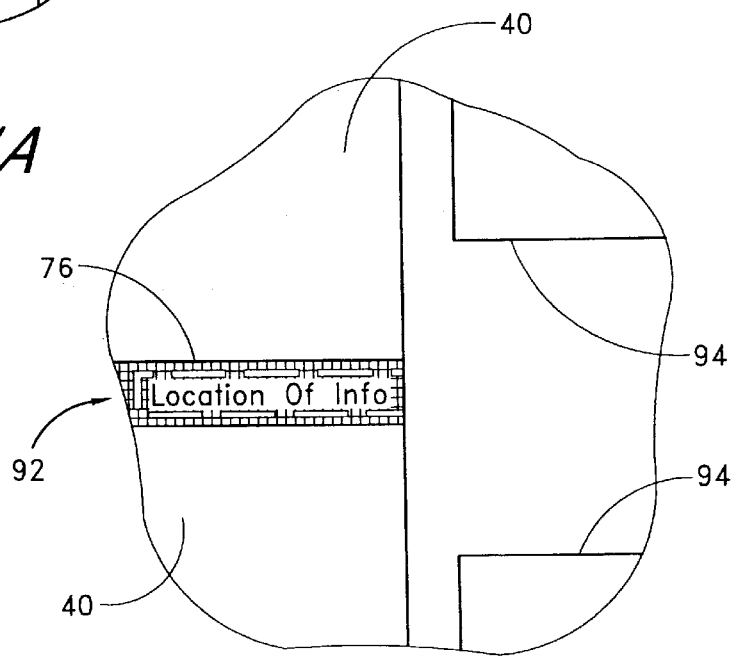

With respect to the location of the registration reference marks 76, each mark is preferably located on a portion of the film closely adjacent to each frame 40. In one embodiment shown in FIG. 11, the registration reference mark 76 is located in the longitudinal space 92 between each frame 40. This space 92 is large enough to fit the registration reference marks 76 in most film formats. The registration reference marks 76 also could be located on the outside of the film's perforations 94, or between the perforations. However, this is not a preferred location because it is ordinarily occupied by sound track information.

In the alternative, the registration reference mark 76 may be located within the image itself, but this would require an image capture system that could scan an image and then interpret the location of the mark from the entire frame 40. Accordingly, this approach has certain drawbacks. The registration reference marks 76 also could be applied with ink or a magnetic charge that is invisible to the naked eye, but that could be read by an appropriate sensor. However, the preferred location of the registration reference marks 76 is immediately outside the frame 40. By placing the registration reference marks 76 outside the frame 40, they can be read by the sensor without affecting the image to be projected. The most preferred location of the registration reference marks 76 is in the space 92 between each frame 40.

The registration reference marks 76 may be placed on the film 10 in any suitable manner, preferably during the manufacture of IN's, IP's or other intermediate printing process, or in the equivalent digital version of that process ("digital intermediate"), wherein fades, dissolves, titles, effects, color "timing," density corrections, and other intermediate processes are handled digitally before scanning back out to film. For example, the registration reference marks 76 may be applied to the film by a laser device precisely mounted on a registered contact "step" printer. The precise method of mounting the laser device to such a printer will vary with the different types of printers, and various techniques exist to modify step printers for placement of such laser devices. Other suitable devices may be used to apply the registration reference marks 76, in particular, the outline of the three geometric shapes. Regardless of the device that is selected, it must be able to apply the registration reference marks 76 to the film 10 such that the square 78, circle 80 and triangle 82 are transparent and surrounded or outlined by a non-transparent portion. Alternatively, the square 78, circle 80 and triangle 82 may be non-transparent and surrounded or outlined by a transparent portion. Laser devices are capable of providing these types of registration reference marks by use of appropriate masking and the like, but other suitable devices may be used as desired.

In applying the registration reference marks 76 to the film 10, it is important to position each registration reference mark in a location that most closely tracks the exposure of each frame 40 onto the intermediate film. Accordingly, each registration reference mark 76 should be applied to the film 10 as close as possible to its corresponding frame 40 and the operative registration pins of the contact "step" printer. In this manner, the laser device, or other suitable device, can precisely apply the registration reference marks 76 in the same location as each frame 40 is exposed onto the intermediate film stock.

If the registration reference marks 76 are applied during the "digital intermediate" process, the marks can be placed in the correct position by means of the imaging computer and its associated software. They can then be placed on the film elements generated thereby using the same film recorder technology as is used to duplicate the film images themselves.

Alternatively, if the registration reference marks 76 are applied in the context of dye-transfer (imbibition, "IB") printing (e.g. the original TECHNICOLOR 3-strip process), the marks may be placed prior to making the separation matrixes, or otherwise as appropriate to insure that they maintain alignment with the frames 40 themselves throughout the duplication process. The IB process is fully pin-registered, unlike standard duplication using multi-layer Eastmancolor-type film. Therefore, the registration reference marks 76 applied in this instance will have a less involved function, in that they need not be used to correct for printing misalignment, but function simply to insure correct projector registration by compensating for any possible shrinkage, expansion or other such variables.

No matter how the registration reference marks 76 are applied, they should be placed in repeatable precise position relative to the frame 40. In this regard, prior to the manufacture of release prints, the image is still precisely located on the film 10 relative to the perforations. The subsequent process of high-speed contact printing will produce errors in image placement relative to the film edges and perforations, for the reasons described above, such as the variable high-speed printer transport and inevitable misalignment of the bi-packed film moving through the printer. However, because the registration reference marks 76 are aligned to the images themselves, they will be duplicated in the same manner, right next to their respective frame 40. Accordingly, one can still correctly position the image by simply tracking the registration reference marks 76 and by moving the gate 22 to correctly reposition the film 10 accordingly. Hence, even though the images may no longer be precisely located relative to the perforations 94 and the film's edges, they will always be located with precise reference to their respective registration reference marks 76. These registration reference marks 76, though they are located between the projected frames 40 and thus will never appear on the screen, are duplicated with the images themselves during the high-speed contact printing process.

An appropriate sensor must be used to detect and "read" the registration reference marks 76. Preferably, the sensor is fast-acting and triggerable. The sensor also is one that preferably operates on the principle of detecting deviations between light and dark. For example, photocells can not only determine if something is light or dark, but also shades of gray between the two. Solar cells can detect varying light levels and respond at very high speeds. Magnetic pickup heads can read a portion of the film 10 which has been coded, and this information may used to determine the film's location. For the reasons set forth below, LED and CCD technology is the currently preferred sensor-based system, However, it will be understood that LED and CCD technology is not the only suitable sensor system, and other types of suitable sensors may be used.

Figure 13:
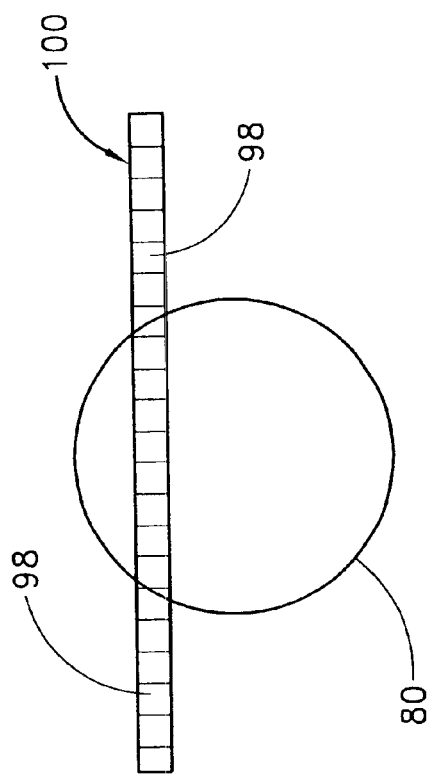
FIG. 13 shows a line CCD array according to another embodiment of the invention.
Figure 12:
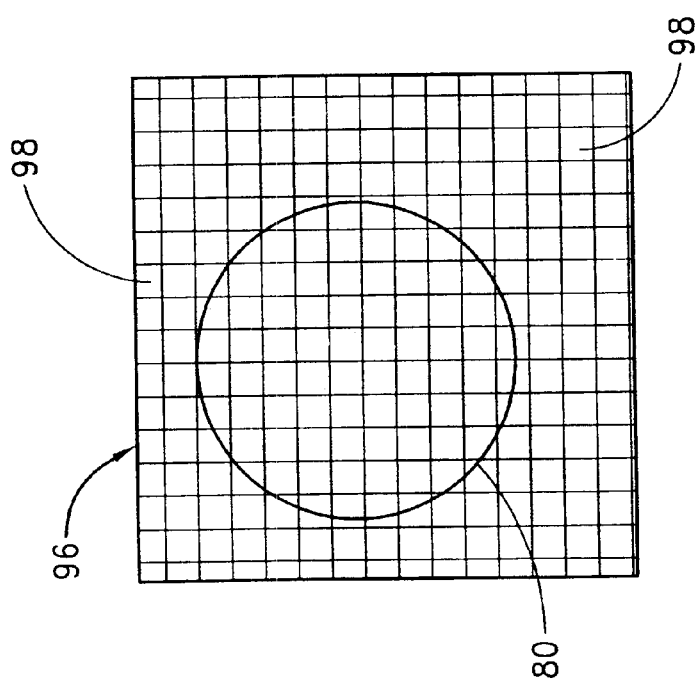
FIG. 12 shows a matrix CCD array according to one embodiment of the invention.

CCDs are well-known devices having defined pixels that can be exposed by light and read digitally. They are not only very fast, but they also allow direct connection to most digital systems. Both an X and Y matrix CCD or line CCD are suitable. As shown in FIGS. 12–13, the difference between them is only in the number and arrangement of pixels. The matrix CCD 96, shown in FIG. 12, has a number of pixels 98 in both the X and Y directions, resulting in an X–Y matrix. This type of CCD usually takes longer to evaluate due to the larger number of pixels 98 on the cell. The line CCD 100, shown in FIG. 13, uses the same technology, but with only a single row of pixels 98. This single row of pixels 98 is quicker to read and contains less data to sort and analyze.

In order for the line CCD array to work, the film 10 must be illuminated to cast the outline of the three geometric shapes, i.e., the square 78, the circle 80 and the triangle 82, onto the CCD array 96 or 100. There are several options available to illuminate the film 10. Of course, the opening of the shutter will illuminate the mark 76 and thereby expose the CCD. However, if the film 10 is moving while the shutter is open, it will cause a blurring of the image on the screen, which is unacceptable.

Therefore, the registration reference mark 76 preferably is illuminated while the shutter is closed so the corrective move can be completed before the shutter opens. One way to illuminate the registration reference marks is by utilizing an LED array 102. This array can turn on briefly and expose the CCD array 100 through the film 10 while the shutter is still closed. The LED array 102 may be either visible-light based or invisible-light based. The benefit of the invisible light array is that it prevents any bleed-through light from the LED array 102 from being projected and thus visible to the audience. For example, this array could flash 2.5 ms prior to the opening of the shutter, allowing enough time for the actuator to move the gate 22 before the shutter opens. The LED array 102 is the presently preferred way to illuminate the CCD array 100.

Figure 16:
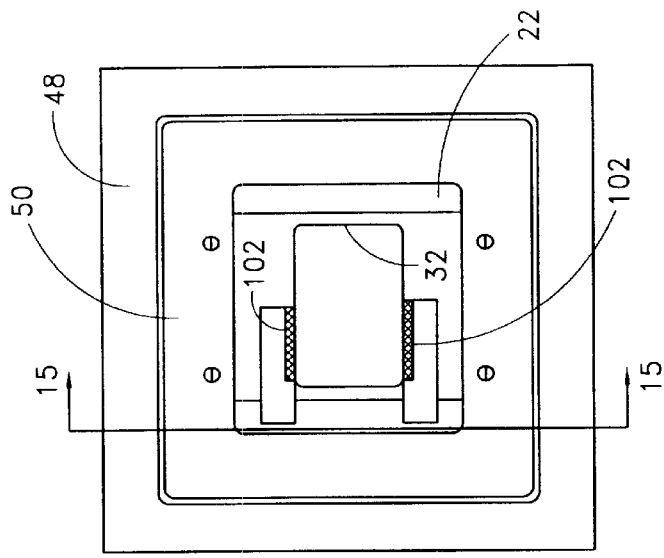
FIG. 16 is a front elevational view of the projector gate and associated projector structure, similar to FIG. 14.
Figure 15:
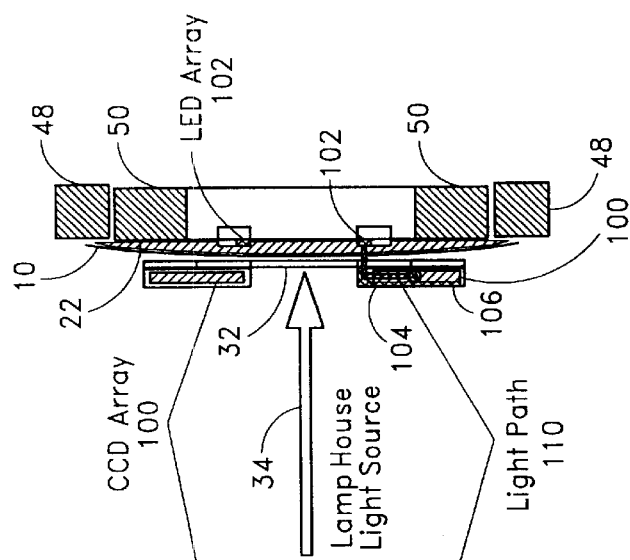
FIG. 15 is a side elevational view of the projector gate and associated projector, taken along the line A—A of FIG. 16.
Figure 14:
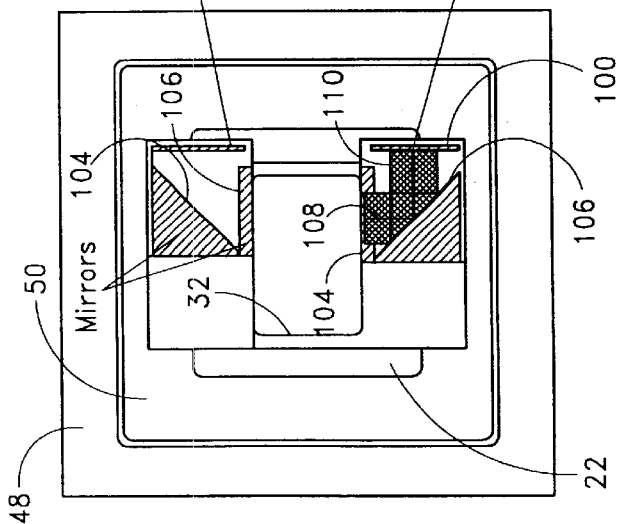
FIG. 14 is a rear elevational schematic view of a projector gate and associated projector structure embodying the novel features of the present invention.

One embodiment of the sensor, using arrays of LEDs and CCDs, is illustrated in FIGS. 14–16. In this embodiment, there are two sets of arrays of LEDs 102 and CCDs 100, with one set above and one set below the aperture 32 in the aperture plate 30 of the projector 16. This arrangement provides redundancy and increased reliability when, for example, there are two registration reference marks 76 associated with each frame 40 and both sets of arrays 100 and 102 are in use. Alternatively, only one of the sets of arrays could be used, and if one of the sets malfunctioned, the other set could be activated to keep the system operating. However, it is not necessary or required to use multiple sets of LED and CCD arrays. Therefore, FIGS. 14–16 will be discussed with reference to only one of the LED/CCD arrays, and it will be understood that the description applies equally to both sets of arrays.

FIG. 14 is a rear elevational view of the projector gate 22, and FIG. 15 is an elevational side view of the projector gate taken along the line A—A of FIG. 16, which is a front elevational view of the projector gate. Before discussing the LED/CCD arrays 100 and 102, the piezoelectric motor flexure stage 46 shown in FIGS. 14–16 will be discussed briefly. As shown in these drawings, the stage 46 has its moveable inner frame 50 connected to the projector gate 22, which has been disconnected from its conventional projector support structure. The inner frame 50 may be connected to the gate 22 in any suitable manner, such as by bolts, screws or the like that will provide a secure connection between the inner frame of the stage and the gate. The outer frame 48 of the stage 46 surrounds the inner frame 50 and is connected to the adjacent projector structure that is fixed against movement relative to the gate 22. Thus, movement of the inner frame 50 of the stage 46 will result in corresponding movement of the gate 22, in accordance with the principles of the invention.

There is an LED array 102 on the front side of the gate 22, which is to the right in FIG. 15. This array 102 is adapted to transmit light through an aperture in the gate 22 and another aperture 32 in the aperture plate 30 so that light from the LED array 102 passes through the film 10 when the film is stopped in the gate 22 during the intermittent pulldown. Thus, once the film 10 has stopped in the gate 22, the LED array 102 is quickly activated to pass light through the registration reference mark 76 associated with the frame 40 that is about to be projected. As a result, certain pixels 98 in the CCD array 100 will be illuminated and others will not, depending on whether the geometric shapes are transparent or non-transparent. In either case, the light will pass through the film 10 to the back side of the gate 22, which is to the left in FIG. 15.

With reference to FIGS. 14 and 15, as the light passes horizontally through the film 10, the light that passes through the registration reference mark 76 is received by a first mirror 104. As shown in FIG. 14, this first mirror 104 reflects the light vertically downwardly toward a second mirror 106. The reference numeral 108 represents the line of travel of the light, and the reference numeral 110 represents the band of the total light that is transmitted. The second mirror 106 then reflects the transmitted light along a generally horizontal path outwardly to one side of the aperture 32, where it is received by the CCD array 100. As a result, the transmitted light will illuminate certain pixels 98 in the CCD array 100. With this information, the location of the registration reference mark 76 can be determined.

In the first step of this determination, the number of pixels 98 illuminated in the CCD array 100 by the first registration reference mark 76 (associated with the first frame) establishes the "benchmark" for the registration of all subsequent frames 40. As noted previously, this "benchmark" frame should be centered as much as possible with respect to the optical axis of the projector lens 36. With this information, the location of the first registration reference 76 mark with respect to the aperture 32 is determined. This location will correspond to the center of the circle 80 and the geometric center of the square 78 for all future calculations. In other words, this will be the location of a frame 40 that is properly registered with respect to the aperture 32.

Figure 17:
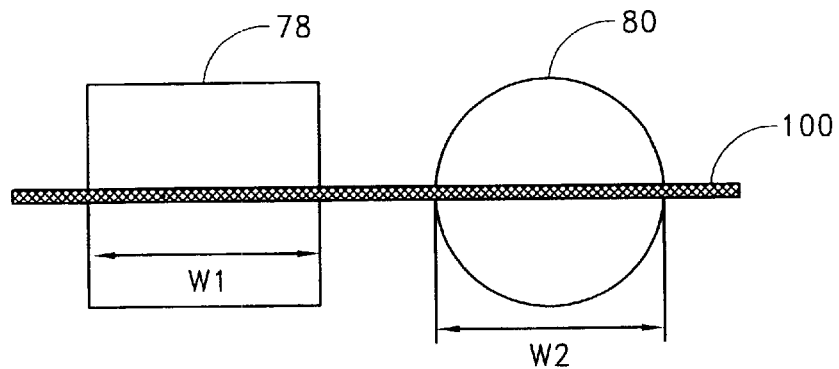
FIG. 17 shows selected portions of a registration reference mark according to one embodiment of the invention.
Figure 18:
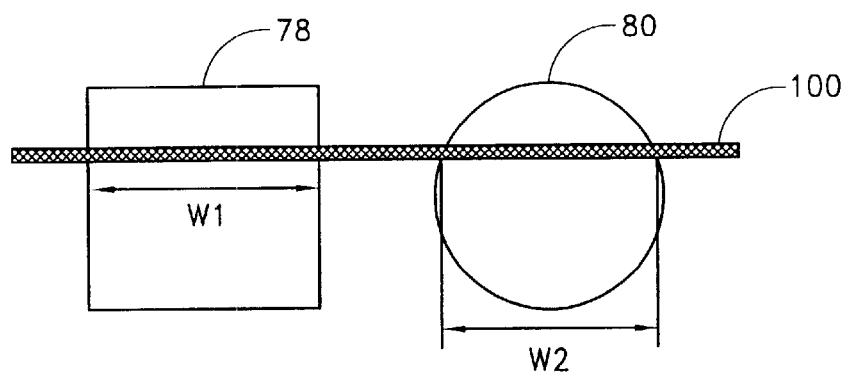
FIG. 18 shows additional aspects related to the registration reference mark.

When the LED array 102 is activated again for the next succeeding frame 40, the light passes through the registration reference mark 76 associated with that frame and certain pixels 98 of the CCD array 100 are illuminated again. The number of pixels 98 illuminated by the circle 80 are compared to the number of pixels 98 illuminated by the square 78. As shown in FIG. 17, if the number of pixels 98 illuminated by the square 78 and the circle 80 are equal (i.e., when $W_1=W_2$), then the CCD array 100 necessarily falls directly through the center of the circle 80 and the geometric mid-point of the square 78, meaning that the frame 40 is properly registered in the Y direction with respect to the aperture 32 and no corrective movement in the Y direction is required. However, when the number of pixels 98 illuminated by the circle 80 is less than the number illuminated by the square 78 (i.e., when $W_2<W_2$), as shown in FIG. 18, then the frame 40 is misregistered with respect to the aperture 32 and gate movement in the Y direction is required to properly register the frame.

To determine whether the CCD array 100 is located above or below the center of the circle 80, the pixels 98 illuminated by the triangle 82 are also read. Depending on the number of pixels 98 that are illuminated by the triangle 82, it can be determined whether the frame 40 needs to be moved in the positive Y direction or the negative Y direction to achieve proper registration of the frame. For example, if the number of pixels 98 illuminated by the triangle 82 is above a certain value, then it can be determined that the CCD array 100 is located below the center of the circle 80. Thus, by comparing all of the CCD array data generated from each geometric shape, it is possible to determine the amount of movement and the direction of movement necessary to properly register each frame 40.

Figure 19:
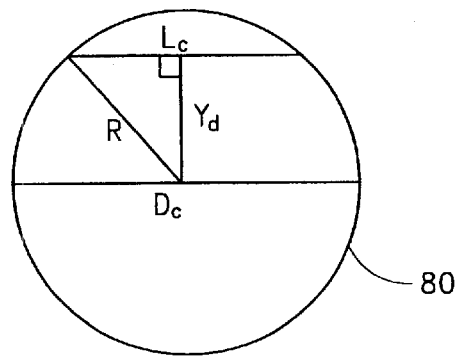
FIG. 19 shows another selected portion of the registration reference mark, including reference lines for calculation of frame misregistration.

FIG. 19 helps illustrate the calculations associated with the circle 80 that need to be made to determine the extent of any misregistration in the Y direction. In FIG. 19, $D_c$ represents the diameter of the circle 80 and the width of the square 78. $L_c$ represents the length of a chord of the circle 80 and the location of the CCD array 100 relative to the center of the circle. $Y_d$ represents the offset of the CCD array 100 in the Y direction, as measured from the center of the circle 80. R represents the radius of the circle 80, or ½ of $D_c$. To calculate the amount of misregistration in the Y direction, simple mathematics using the Pythagorean theorem is used according to the following equation, where $Y_d$ equals the amount of misregistration in the Y direction:

$$Y_d = \sqrt{\left(\frac{D_c}{2}\right)^2 - \left(\frac{L_c}{2}\right)^2}$$

To calculate the amount of misregistration in the X direction, it is necessary simply to know the location (i.e., the pixel) on the CCD array 100 corresponding to the center of the circle 80 of the first registration reference mark 76. This location will correspond to the center of the circle 80 and the midpoint on the CCD array 100 for all subsequent circles. When light from the LED array 102 passes through subsequent circles 80 and illuminates the CCD array 100, the midpoint of the chord Lc for those circles will be calculated and compared to the midpoint of the CCD array 100 as determined by the first circle 80. If there is a difference between the midpoint of a subsequent circle 80 and the midpoint of the CCD array 100, then the amount of misregistration in the X direction can be calculated based on the difference in distance between these two points.

In view of the above, it will be appreciated that the CCD array also can be configured to act as the "benchmark" for the registration of the frames 40, in conjunction with the registration reference marks 76. For example, a predefined location on the CCD array can be selected as the location to which all frames will be moved. By using the registration reference marks 76 to move all frames 40 a predefined location on the CCD array, the undesirable jitter and weave will be eliminated.

One of the advantages of using geometric shapes to comprise the registration reference mark 76 is that fluctuations that occur during the film production process, or fluctuations in the illumination of the marks, will not affect the results of the gate movement calculations. For example, if film exposure and reprinting makes the square 78 smaller or larger than its original size, the circle 80 and triangle 82 will change in size by the exact same ratio. Furthermore, lower or higher power illumination will not affect the ability to calculate the center of the circle 80 because of the corrective nature of the other two geometric shapes, namely the square 78 and the triangle 82.

Figure 20:
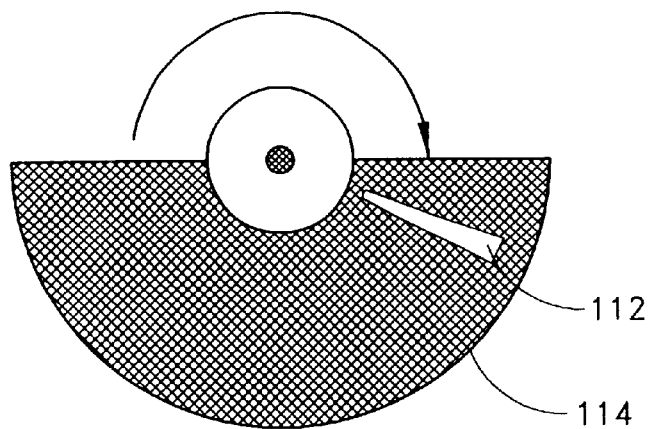
FIG. 20 is a schematic illustration of one alternative for illuminating the registration reference marks.

Another possible way to illuminate the CCD array 100, shown in FIG. 20, is to provide a notch 112 in the shutter 114 in a way that allows exposure of the CCD array 100 before the shutter opens. However, this method may cause a ghosting image across the film while the notch 112 moves across the film frame 40, which would be unacceptable.

Figure 21:
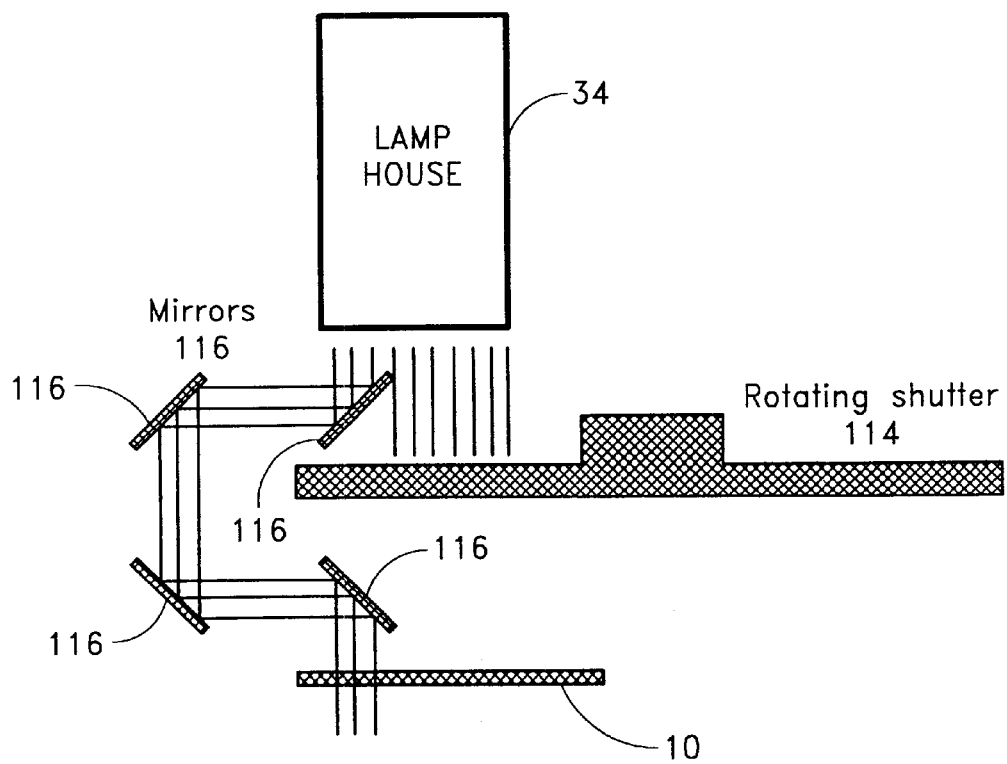
FIG. 21 is a schematic illustration of another alternative for illuminating the registration reference marks.

Alternatively, light from the lamp house 34 may be directed around the film 10 and used to expose the registration reference mark 76 while the shutter is closed, as shown in FIG. 21. This system would require mirrors 116 or a light pipe, for example, to channel the light to the appropriate location.

Each of the registration reference marks 76 is read by the sensor as soon as the film 10 has stopped in the gate 22. However, sensing the registration reference marks 76 at a different time is possible and opens some advanced processing possibilities. For example, if the registration reference mark 76 is sensed before the frame 40 associated with that mark has stopped in the gate 22, a period of time longer than 1.5 milliseconds can be used to analyze the mark. By increasing the time available for analysis, a slower, less expensive registration processor (discussed below) may be used. Moreover, if the registration reference mark 76 can be read and analyzed before the frame 40 is stopped in the gate 22, the gate can be commanded to move toward the correct position during the pull down of the frame by the intermittent sprocket 24. This would allow approximately 10 milliseconds of time to move the gate 22 instead of 1 millisecond or less if the registration reference mark 76 is not read until the film 10 fully stops in the gate 22.

In another aspect of the invention, corrective gate movement could be at least partially determined by searching for and determining the existence of a trend of misregistration of the film 10 from one frame 40 to the next. Based on the nature of the "trending," basic corrective gate movements could be predicted and executed. While a trending system does not cancel all error when the film 10 stops, it should at least eliminate the errors associated with the film duplication process. By analyzing how several successive frames 40 have stopped in the gate 22, a film stop deviation may be trended and corrected by appropriate gate movement. Although this method could possibly correct for the major deviations causing misregistration of the frames 40, it is unlikely to be as accurate as analyzing the registration reference marks 76 once the film 10 has stopped in the gate 22 and before the shutter 114 has opened.

Figure 22:
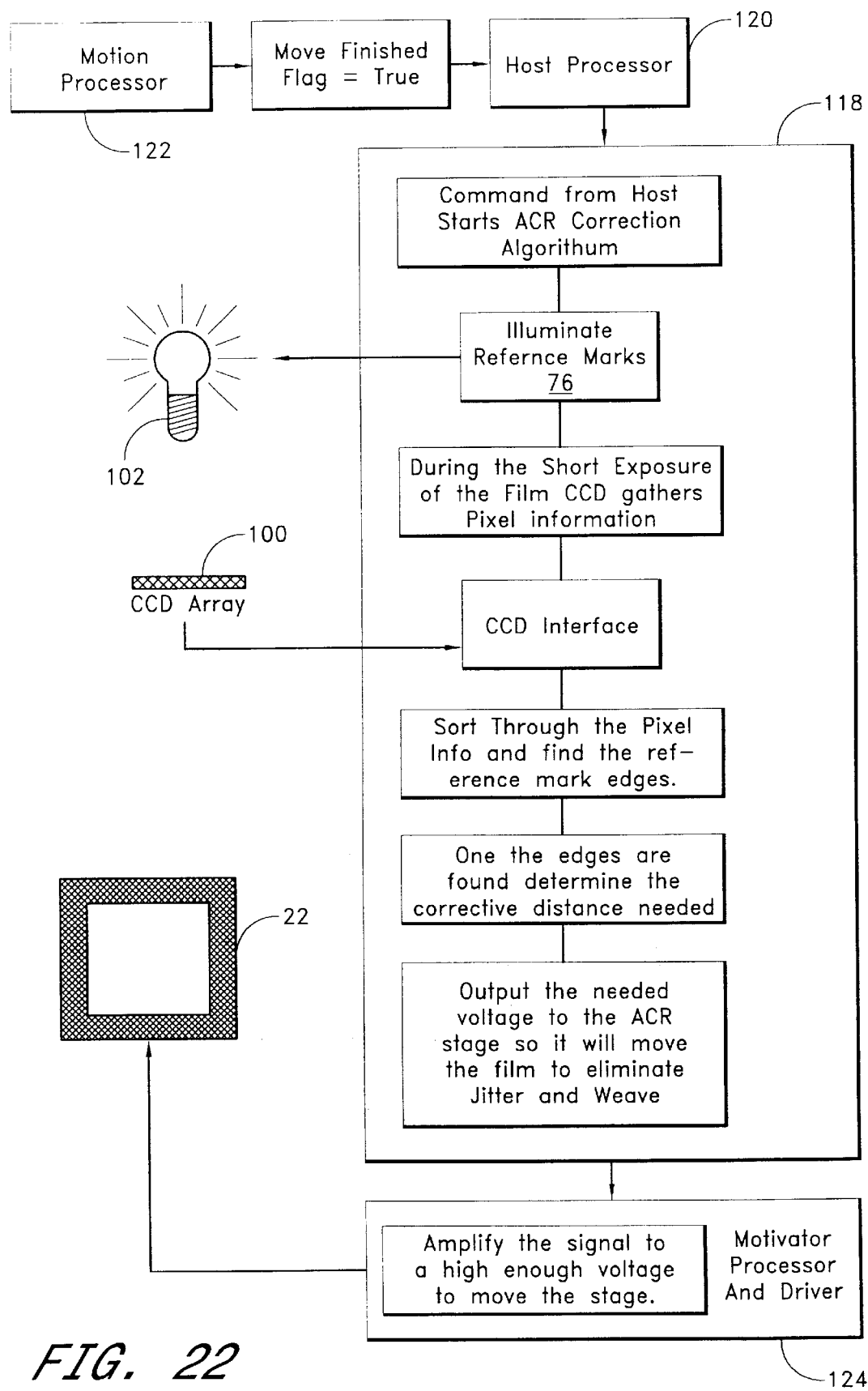
FIG. 22 is a block diagram showing a registration processor and other related processor components in accordance with the present invention.

In accordance with the invention, a registration processor 118 governs the operation of the system. With reference to FIG. 22, the registration processor 118 communicates with a host processor 120 to receive information related to film format (e.g., a four-perforation per frame format or a three-perforation per frame format), frame rate, brightness, and so forth. The host processor 120, in turn, communicates with a motion processor 122 that controls operation of the projector 16. The host processor 120 will inform the registration processor 118 if the film 10 contains registration reference marks 76 and, if so, the type of registration reference marks being used. The connection between the host processor 120 and the registration processor 118 also will provide a line of communication for determining registration status and correct operation.

Upon a command from the host processor 120, the registration processor 118 commences its operation to precisely register the frames 40. The registration processor 118 will activate the LED array 102, for example, to illuminate the registration reference marks 76 which, in turn, project the outline of the three geometric shapes onto the sensor, such as a line CCD array 100, in the manner described above. The registration processor 118 then analyzes the pixel information gathered from the sensor, sorts through the information and determines the location of the frame 40 being registered relative to the previous frame. Once this information is known, the registration processor calculates the distance, in both the X direction and the Y direction, by which the frame 40 is misregistered with respect to the previous frame. This calculation can be in the form of a vector direction and length, which determines the corrective direction and distance needed to move the gate 22.

Depending upon the direction and the length of the vector, the amount of voltage or other signal needed to move the gate 22 in the X direction and/or the Y direction is calculated. A command signal containing the necessary information is then transferred to an actuator processor and driver 124 to generate an appropriate signal. For example, if the actuator is the piezoelectric motor 42, then the signal will be a voltage signal. The actuator processor and driver 124 amplifies the voltage signal to produce a precise voltage that is applied, for example, through the cable 60 to the piezoelectric motor flexure stage 46, which then moves the gate 22 in the X and/or Y directions to move the frame 40 into precise alignment with respect to the previous frame.

The registration processor 118 may take several forms. For example, commercially available microprocessors, digital signal processors, microcontrollers, analog circuits and other suitable processors may be used. In addition, a combination of these various types of processors can be used to determine and send the corrective move signal to the actuator.

In other aspects of the invention, the registration processor 118 may default to a lower level of frame registration accuracy, as may be appropriate. For example, if the host processor 120 informs the registration processor 118 that the film 10 in the projector 16 does not have registration reference marks 76, the registration processor 118 may default to a mode in which the sensor reads the position of perforations 94 instead of registration reference marks 76 on the film 10. In this default mode, the sensor would determine the location of a particular perforation 94 associated with a frame 40 and place each successive perforation (associated with each successive frame) in overlapping relation to the one that preceded it. Even though this default mode would be less accurate than systems that read the registration reference marks 76, an increase in film registration accuracy nevertheless can be achieved as compared to conventional projectors having no such system.

In another more detailed aspect of the invention, information regarding the location of the registration reference marks 76 and the corresponding corrective movements of the gate 22 may be analyzed and stored in the registration processor 118. By analyzing and storing this information for enough frames 40, the registration processor 118 may provide an estimate of the corrective move that will be required before a frame 40 enters the gate 22. This provides several advantages.

First, as mentioned previously, this "trending" allows movement of the gate 22 prior to the correct analysis as the frame 40 is being pulled into the gate. This minimizes the distance the gate 22 has to move once the actual move has been calculated. If the majority of the misregistration can be corrected by gate movement during the actual pulldown of the frame 40 into the gate 22, then only a minor correction will be necessary once the film 10 has stopped moving. Accordingly, if the distance of this final corrective move is small, it can be performed more quickly than a longer corrective move.

Second, this trending allows corrective moves to be made with respect to film frames 40 that do not have any registration reference marks 76, or where the registration reference marks have been corrupted in some way and cannot be read. For example, if the film 10 is damaged or dust or other contaminants obliterate a registration reference mark 76, either in whole or in part, it may not be possible to read the registration reference mark. In these circumstances, an accurate determination of the corrective action necessary with respect to that particular frame 40 will not be possible. However, instead of bypassing corrective action with respect to this frame 40 altogether, the trend in misregistration of the immediately preceding frames will allow the registration processor 118 to predict the proper location of the film frame 40 to correct for as much misregistration as possible.

As an additional feature, the design of the gate 22, in conjunction with the motion processor 122 and the registration processor 118, may include a system to permit high-speed computer control over the resistance to film movement in the gate. For example, after the film 10 has stopped in the gate 22, the resistance may be decreased to provide a low starting friction component when the film is pulled down by the intermittent sprocket 24. This reduced gate friction would allow lower peak intermittent sprocket torque and would reduce the stresses placed on the film 10 by the gate 22 during the intermittent pull down move. Near the end of the intermittent pull down move, appropriate friction necessary to stop the film 10 may be reapplied back to the gate 22. This repeated cycle of decreasing and increasing gate friction would accomplish the objectives of stopping the film 10 accurately at the end of each pulldown move, while reducing the work required to move the film at the beginning of each move.

In view of the foregoing, it will be appreciated that the principles of the present invention can be applied in numerous ways to eliminate jitter and weave. For example, instead of using the registration reference marks 76 to move the gate 22, these marks can be used to manipulate other components in the projector as appropriate to eliminate the jitter and weave. These manipulations can be accomplished by mechanical, optical and other appropriate means. Therefore, while a particular form of the invention has been illustrated and described, it will be apparent that various modifications can be made without departing from the spirit and scope of the invention. Accordingly, it is not intended that the invention be limited, accept as by the appended claims.

What is claimed is:

1. A method of registering frames of film with respect to an aperture in a motion picture projector, comprising:
   a. applying registration information to the film corresponding to the location of the frames on the film;
   b. moving the film through the projector and intermittently stopping the film frame-by-frame with respect to the aperture;
   c. reading the registration information associated with each frame prior to projection to determine the location of the frame with respect to the aperture;
   d. determining the amount of correction that is necessary to achieve proper registration of the frame with respect to the aperture prior to projection;
   e. moving the frame into proper registration with respect to the aperture prior to projection.

2. A system for registering frames of film in a motion picture film projector having a gate for receiving film during intermittent advancement of the film through the projector, comprising:
   a. an actuator connected to the gate that is adapted to move the gate relative to the aperture;
   b. a sensor that reads registration information on the film associated with each frame to determine the location of the frame with respect to the aperture prior to projection; and
   c. a registration processor connected to the sensor and the actuator that is adapted to determine the amount of movement that is necessary to move the gate and thus the frame into proper registration with respect to the aperture.

3. The system of claim 2, wherein the actuator comprises a piezoelectric motor.

4. The system of claim 2, wherein the actuator comprises a piezoelectric motor flexure stage.

5. The system of claim 2, wherein the actuator comprises a moving coil motor.

6. The system of claim 2, wherein the registration information applied to the film comprises a registration reference mark that is read by the sensor.

7. The system of claim 6, wherein the registration reference mark comprises a plurality of geometric shapes.

8. The system of claim 7, wherein the geometric shapes comprise at least a circle and square.

9. The system of claim 8, wherein the geometric shapes further comprise a triangle.

10. The system of claim 2, wherein the registration information is applied to the film in a space between adjacent frames on the film.

11. The system of claim 2, wherein the sensor comprises a light-based sensor.

12. The system of claim 11, wherein the light-based sensor comprises an LED array and a CCD array.

13. The system of claim 12, wherein the light-based sensor further comprises a mirror for reflecting light transmitted from the LED array onto the CCD array.

14. The system of claim 2, further comprising redundant sensors adapted to read redundant registration information associated with each frame.

15. The system of claim 2, wherein the registration processor controls operation of the sensor and processes the registration information for each frame to determine the location of successive frames relative to the aperture.

16. The system of claim 15, wherein the registration processor further determines the amount of film misregistration from one frame to the next and generates an output signal that is delivered to the actuator, and wherein the output signal commands the actuator to move the gate such that the frames are correctly registered with respect to the aperture.

17. The system of claim 16, wherein the output signal is a voltage based signal.

18. The system of claim 16, wherein the output signal is a current based signal.

19. The system of claim 2, wherein the actuator is configured to move the gate in increments as small as approximately 0.000002 inches in about one millisecond or less.

20. The system of claim 2, wherein the actuator and gate are configured such that the actuator can move the gate at least 0.006 inches in both the X direction and the Y direction.

21. A device for registering motion picture film in a projector, comprising:
   a. a gate for receiving film and intermittently stopping frames of the film relative to an aperture, wherein the gate is moveable with respect to the aperture;
   b. an actuator connected to the gate, wherein the actuator is configured to move the gate relative to the aperture; and
   c. a processor that commands the actuator to move the gate relative to the aperture based on registration information on the film adjacent to the frames.

22. Motion picture film, comprising:
   a. a length of motion picture film having a plurality of projectable images on the film, wherein each image is defined by a frame; and
   b. registration information applied to the film adjacent to a plurality of the frames, wherein the registration information is located in the same position relative to each of the frames, the registration information comprising a plurality of different shapes that are capable of being read by a sensor, when the shapes comprise at least a circle and a square or rectangle, and wherein the diameter of the circle is equal to the width of the square or rectangle.

23. The motion picture film of claim 22, wherein the plurality of different shapes further comprises a triangle adjacent to the circle and the square or rectangle.

24. The motion picture film of claim 23, wherein the registration information is located in the space between adjacent frames.

25. The motion picture film of claim 22, wherein the registration information is located outside the frame.

26. The motion picture film of claim 22, wherein redundant registration information is applied to the film for each frame.

* * * * *

UNITED STATES PATENT AND TRADEMARK OFFICE
CERTIFICATE OF CORRECTION

PATENT NO. : 6,450,644 B1
DATED : September 17, 2002
INVENTOR(S) : Dean K. Goodhill et al.

It is certified that error appears in the above-identified patent and that said Letters Patent is hereby corrected as shown below:

Column 24,
Line 50, change "when" to -- wherein --.

Signed and Sealed this

Second Day of December, 2003

JAMES E. ROGAN
*Director of the United States Patent and Trademark Office*